United States Patent [19]
Yaji et al.

[11] Patent Number: 5,572,280
[45] Date of Patent: Nov. 5, 1996

[54] PHOTOELECTRIC CONVERSION APPARATUS AND CAMERA USING THE SAME IN FOCUS DETECTION THEREOF

[75] Inventors: Tsuyoshi Yaji, Kawagoe; Masayuki Uno, Ina, both of Japan

[73] Assignee: Olympus Optical Co., Ltd., Tokyo, Japan

[21] Appl. No.: 311,166

[22] Filed: Sep. 23, 1994

[30] Foreign Application Priority Data

Sep. 29, 1993 [JP] Japan .................................. 5-242761

[51] Int. Cl.⁶ .......................... G03B 13/36; H04N 5/235
[52] U.S. Cl. ........................ 396/96; 348/229; 348/297; 348/300; 396/99; 396/111; 396/125
[58] Field of Search ................................... 354/402, 403; 348/229, 230, 297, 298, 299, 300, 309, 345

[56] References Cited

U.S. PATENT DOCUMENTS 4,870,441 9/1989 Yamasaki ........................ 354/402
5,227,834 7/1993 Ishida et al. ..................... 354/402

Primary Examiner—W. B. Perkey
Attorney, Agent, or Firm—Frishauf, Holtz, Goodman, Langer & Chick

[57] ABSTRACT

A photoelectric conversion unit includes a plurality of photoelectric conversion devices for receiving light from an object and storing charge corresponding to the quantity of the received light. A monitor unit outputs a monitor signal corresponding to the received light quantity from the start of the charge storage by the photoelectric conversion unit. When a predetermined time elapses from the start of the charge storage by the photoelectric conversion unit, a monitor read unit reads out the output monitor signal from the monitor unit. A time determining unit determines a charge storage end time on the basis of the monitor signal read out by the monitor read unit. When the charge storage end time determined by the time determining unit elapses, a signal read unit reads out charge signals stored in the photoelectric conversion devices of the photoelectric conversion unit.

18 Claims, 12 Drawing Sheets

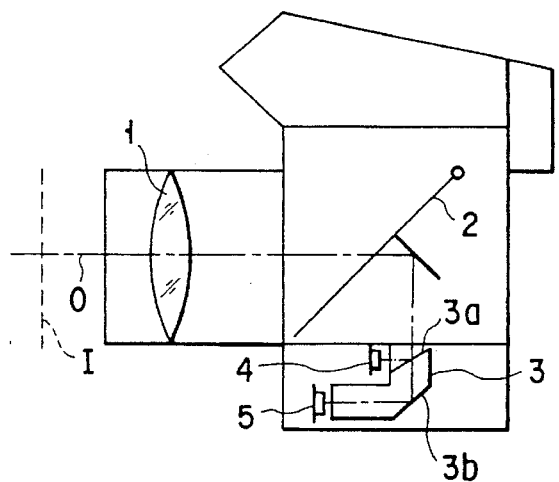
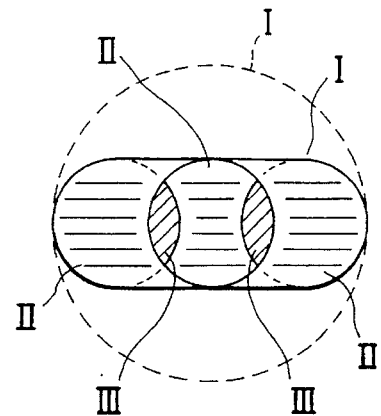
F I G. 1A  F I G. 1B
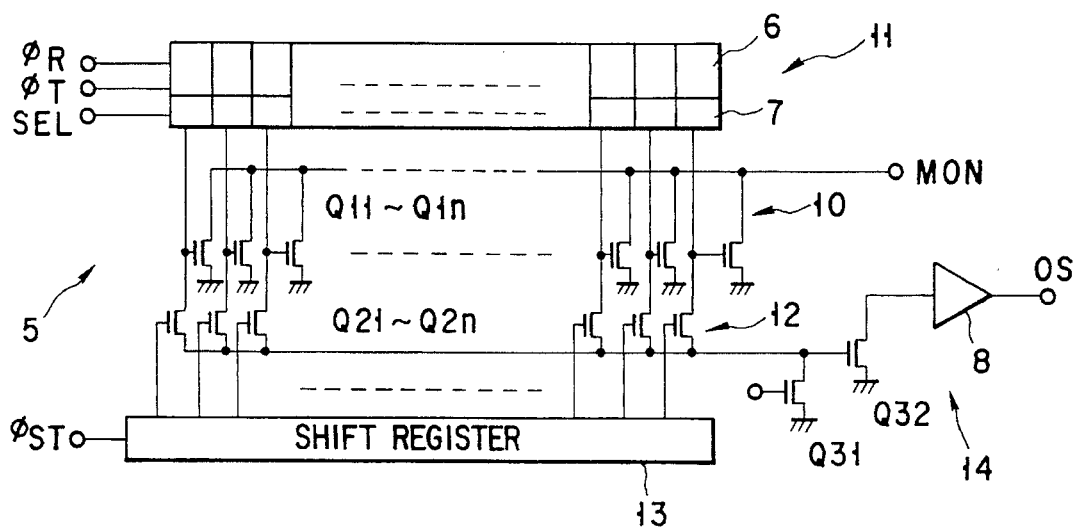
F I G. 1C

| COMMAND No. | 4-BIT SERIAL COMMAND (CODE) | | | | NAME OF CONTROL |
|---|---|---|---|---|---|
| | $D_3$ | $D_2$ | $D_1$ | $D_0$ | |
| 0 | 0 | 0 | 0 | 1 | RESET 0 |
| 1 | 0 | 0 | 1 | 0 | RESET 1 |
| 2 | 0 | 1 | 0 | 0 | PIXEL SENSITIVITY L |
| 3 | 0 | 1 | 0 | 1 | PIXEL SENSITIVITY H |
| 4 | 1 | 0 | 0 | 1 | AGC1 (×1) |
| 5 | 1 | 0 | 1 | 0 | AGC2 (×2) |
| 6 | 1 | 0 | 1 | 1 | AGC4 (×4) |
| 7 | 1 | 1 | 0 | 0 | AGC8 (×8) |

F I G. 3

| $\phi_{SIG}$ | $\phi_{MON}$ | RCK | OPERATION |
|---|---|---|---|
| 1 | 0 | 1 | MONITOR READ |
| 0 | 1 | 1 | STORAGE END |
| 0 | 1 | — | SIGNAL READ |

F I G. 4A

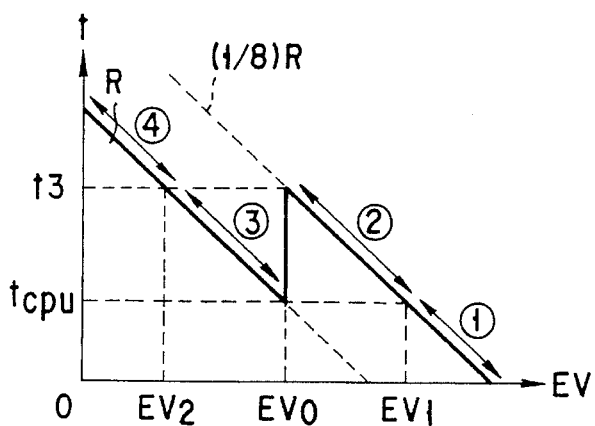
F I G. 9
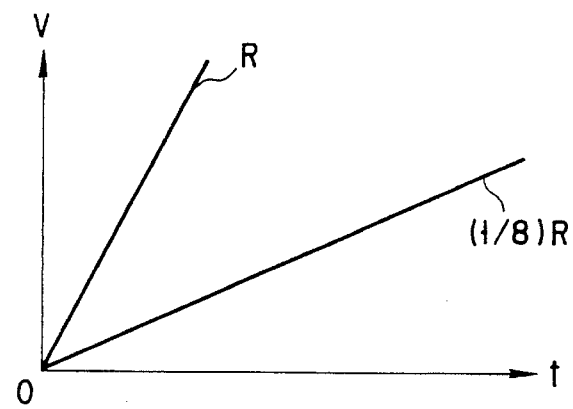
F I G. 10
| No. | PHOTOMETRIC OUTPUT | SENSITIVITY OF-LIGHT-RECEIVING UNIT | AGC | t1 |
|---|---|---|---|---|
| ① | $EV \geq EV_1$ | $(1/8)R$ | ×1 | $t1 < t_{cpu}$ |
| ② | $EV_0 \leq EV < EV_1$ | $(1/8)R$ | ×1 | $t_{cpu} \leq t1 < t3$ |
| ③ | $EV_2 \leq EV < EV_0$ | $R$ | ×1 | $t_{cpu} \leq t1 < t3$ |
| ④ | $EV < EV_2$ | $R$ | ×4 | $t3 \leq t1$ |
F I G. 11

5,572,280

PHOTOELECTRIC CONVERSION APPARATUS AND CAMERA USING THE SAME IN FOCUS DETECTION THEREOF

BACKGROUND OF THE INVENTION

1. Field of the Invention

The present invention relates to a photoelectric conversion apparatus and a camera using the same in focus detection thereof and, more particularly, to a photoelectric conversion apparatus which optimally controls signal storage and signal processing for performing focus detection in accordance with the brightness of an object to be photographed, and a camera using the same in focus detection thereof.

2. Description of the Related Art

Conventionally, various techniques of storing photoelectrically converted signals in a focus-detection photoelectric conversion apparatus such as a camera have been proposed.

As an example, U.S. Pat. No. 4,870,441 discloses a technique in which the storage time and the amplification factor of photoelectrically converted signals are selected after focus detection is started.

In this conventional technique, when a predetermined time elapses from the start of storage of photoelectrically converted signals, the storage level of the output from a storage monitor is compared with a predetermined level. The storage time and the amplification factor are determined on the basis of the comparison result.

In this conventional technique, therefore, the storage time can be efficiently controlled in accordance with the brightness of an object to be photographed.

FIG. 15 is a block diagram showing the arrangement of a photoelectric conversion apparatus according to the above conventional technique.

As shown in FIG. 15, an amplification factor controller 102 connected to a CCD (Charge-Coupled Device) image sensor 101 as a photoelectric conversion device includes a storage time monitor control unit for monitoring signals photoelectrically converted by the CCD image sensor 101.

In accordance with the characteristics of the photoelectrically converted signals monitored by this storage time monitor control unit, the amplification factor for the signals photoelectrically converted by the CCD image sensor 101 is determined.

That is, when a monitor signal $MOS_1$ from the CCD image sensor 101 is applied to a pair of comparators 104 and 106, the comparators 104 and 106 compare the magnitude of the monitor signal $MOS_1$ with reference voltages Vref1 and Vref2 generated by reference voltage generators 103 and 105, respectively.

The comparison results from the comparators 104 and 106 are used by a selector constituted by a flip-flop 107, switches $SW_1$, $SW_2$, $SW_3$, and $SW_4$, and an inverter 109 to determine whether an original storage output signal $OS_1$ from the CCD image sensor 101 is to be passed through an amplifier 108, i.e., whether an amplification factor A is to be switched (A=32) or not to be switched (A=1).

Switching of the amplification factor performed by selecting the switches $SW_1$ to $SW_4$, is determined according to a signal $T_1$ which is generated when a predetermined time elapses after the start of storage and applied to the clock terminal of the flip-flop 107, and an output level from the comparator 106 at that signal generation timing. The characteristic of the switching changes in accordance with the storage monitor output, i.e., the brightness of an object to be focus-detected.

An original storage output signal $OS_2$ amplified on the basis of the amplification factor thus selected is applied to a central processing unit (CPU) for performing well-known focus detection processing via an analog-to-digital (A/D) converter (not shown) in order to perform predetermined signal processing.

Note that a monitor signal $MOS_2$ from the inverter 109 is output to a CCD driver (not shown) to perform transfer control for the CCD image sensor 101.

In the above conventional technique, however, although storage control for signals photoelectrically converted by the CCD image sensor can be performed efficiently, the sizes of the controller and its peripheral circuits are increased. That is, the controller and its peripheral circuits of the scale as illustrated in FIG. 15 are required.

In addition, the above conventional technique requires either taking a variation margin into consideration in setting the storage end level, or an adjustment unit including a D/A converter for converting an A/D-converted signal into an analog signal again and adjusting the signal. This further increases the load on the peripheral circuits and complicates the system configuration.

SUMMARY OF THE INVENTION

The present invention has been made in consideration of the above situations and has as its object to provide a photoelectric conversion apparatus which is reduced in circuit scale and capable of optimally controlling signal storage performed by a photoelectric conversion device.

It is another object of the present invention to provide a camera using a photoelectric conversion apparatus, which is reduced in circuit scale and capable of optimally controlling signal storage performed by a photoelectric conversion device, in focus detection.

According to one aspect of the present invention, there is provided a photoelectric conversion apparatus comprising:

photoelectric converting means including a plurality of photoelectric conversion devices for receiving light from an object and storing charge corresponding to a quantity of received light;

monitor means for outputting a monitor signal corresponding to the received light quantity from start of the charge storage by the photoelectric conversion devices of the photoelectric converting means;

monitor read means for reading out the monitor signal output from the monitor means when a predetermined time elapses from start of the charge storage by the photoelectric converting means;

time determining means for determining an end time of the charge storage by the photoelectric converting means on the basis of the monitor signal read out by the monitor read means; and signal read means for reading out charge signals stored in the photoelectric conversion devices of the photoelectric converting means when the charge storage end time determined by the time determining means elapses.

According to another aspect of the present invention, there is provided a camera comprising:

a focus detection apparatus; and a one-chip microcomputer for controlling the focus detection apparatus, the focus detection apparatus comprising:

a) sensor means having a charge-storage photoelectric conversion device array;

b) monitor means for outputting a monitor signal corresponding to a quantity of light received by the charge-storage photoelectric conversion device array of the sensor means; and c) control means for controlling charge storage and charge signal read of the charge-storage photoelectric conversion device array, wherein the one-chip microcomputer has predicting means for predicting a time during which a charge storage amount of the charge-storage photoelectric conversion device array of the focus detection apparatus becomes appropriate on the basis of the output monitor signal from the monitor means of the focus detection apparatus, and, when predicted time elapses, outputs a storage end signal to the control means of the focus detection apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a schematic view showing the arrangement of a camera using a photoelectric conversion apparatus according to the first embodiment of the present invention in focus detection;

FIG. 1B is a view for explaining a phase difference detection scheme performed by an AF module 3 in FIG. 1A;

FIG. 1C is a block diagram showing a detailed arrangement of a distance measurement sensor 5 in FIG. 1A;

FIG. 3 is a view showing a detailed operation of the sensor control circuit in FIG. 2;

FIGS. 4A and 4B are a table and a timing chart, respectively, showing the relationship between signals of the sensor control circuit in FIG. 2;

FIG. 9 is a graph showing the relationship between the object brightness and the storage time in the fourth embodiment;

FIG. 10 is a graph showing the relationships between the storage voltage and the storage time at different light-receiving sensitivities, i.e., showing the photoelectric conversion characteristics of a light-receiving unit 11 in the fourth embodiment;

FIG. 11 is a view summarizing examples of control for different conditions in the fourth embodiment;

DETAILED DESCRIPTION OF THE PREFERRED EMBODIMENTS

Figure 2:
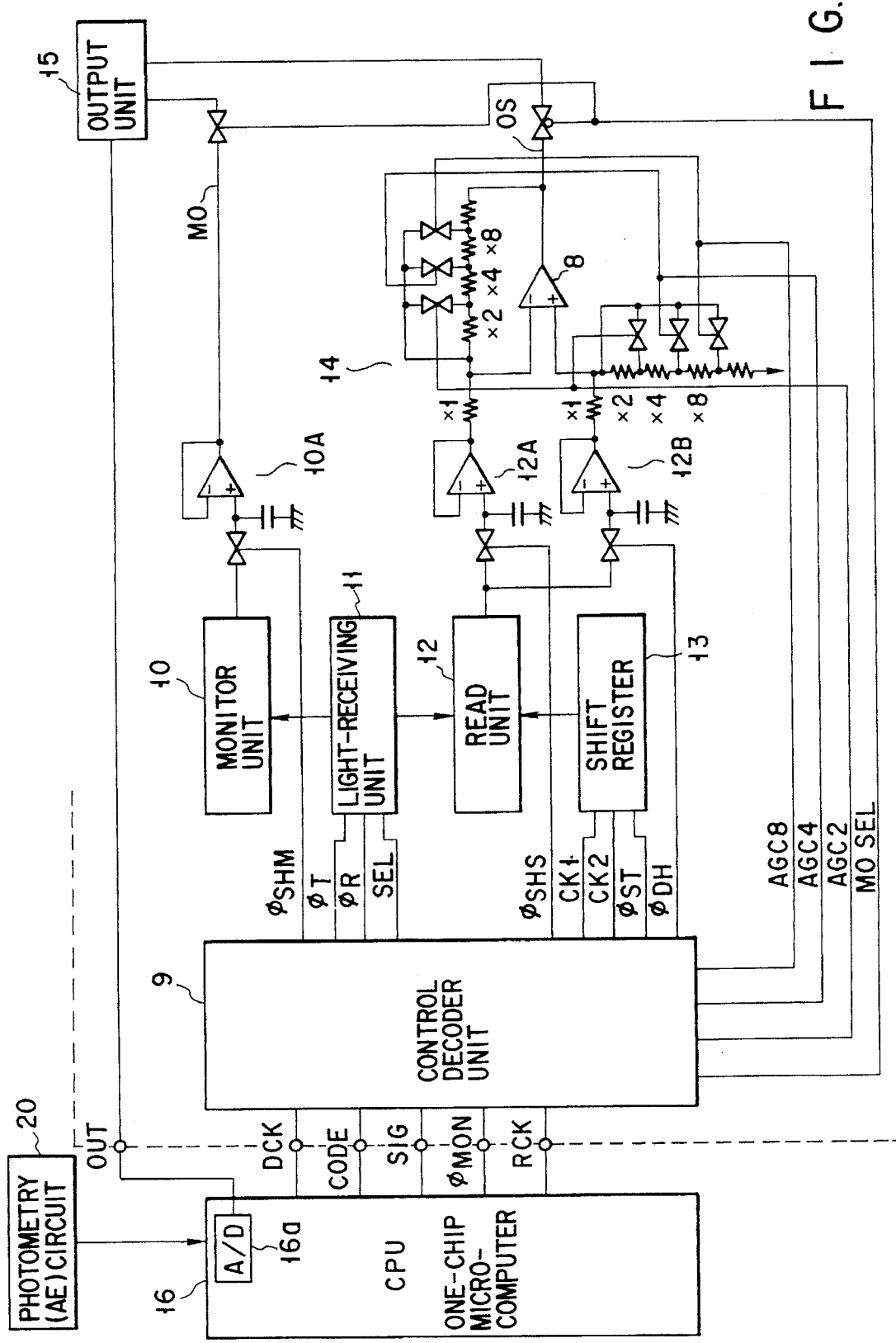
FIG. 2 is a block diagram showing the arrangement of a sensor control circuit for use in the first embodiment.

Several embodiments of the present invention will be described in detail below with reference to the accompanying drawings.

FIG. 1A is a view showing a schematic arrangement of a camera using a photoelectric conversion apparatus according to the first embodiment of the present invention in focus detection.

In this camera as shown in FIG. 1A, light 0 originating from an object to be photographed and passing through an interchangeable taking lens 1 is reflected by a half mirror 2 and guided to an AF (Auto-Focusing) module 3.

As illustrated in detail in FIG. 1B, this AF module 3 is constituted by a detection system generally called a phase difference detection system. The AF module 3 detects a relative displacement from an in-focus position on the basis of the shift between two images obtained from light beams passing through different pupils of the taking lens 1.

Furthermore, FIG. 1B shows a condition that the light beam from the object in the light projecting eye surfaces I of the AF module in FIG. 1A is divided with regions II and III in FIG. 1B.

The light beams incident on the AF module 3 are further guided to a photometry sensor 4 and a distance measurement sensor 5 by half mirrors 3a and 3b in the AF module 3.

That is, in FIG. 1B, reference symbols I denote light beams to be guided to the AF module 3; II, light beams to be guided to the photometry sensor 4; and III, light beams to be guided to the distance measurement sensor 5.

These light beams are so limited by an optical member as to have their respective necessary apertures.

Note that the output from the photometry sensor 4 is used in a known photometry (AE) circuit for performing auto-exposure (AE) processing in the camera.

In addition, in performing focus detection, this camera automatically drives and moves the taking lens 1 to an in-focus position on the basis of the result obtained by processing the output from the distance measurement sensor 5.

A detailed arrangement of the distance measurement sensor 5 is as shown in FIG. 1C.

That is, the light beams II guided by the half mirror 3b of the AF module 3 are incident on one of two light-receiving units 6 and 7 constituting a light-receiving unit 11 consisting of MOS amplification type photodiode arrays in the distance measurement sensor 5, as shown in FIG. 1C. Each of the light-receiving units 6 and 7 includes a plurality of pixels. As will be described later, the light-receiving units 6 and 7 have different sensitivities.

An operation of the distance measurement sensor 5 will be described below. First, the light-receiving unit 6 or 7 is reset by a reset signal $\Phi R$ from a control decoder unit (to be described later).

Thereafter, the light-receiving unit 6 or 7 stores electric charge corresponding to the quantity of incident light.

The charge storage amount of this distance measurement sensor 5 is output as a monitor output signal MON for detecting the peak value of each pixel of the light-receiving unit 6 or 7 via a monitor unit 10 consisting of MOS transistors $Q11$ to $Q1n$. Consequently, the charge storage amount is monitored by external equipment.

Simultaneously, the charge stored in each pixel for a predetermined time in the distance measurement sensor 5 is held in a memory unit in accordance with a storage end signal $\Phi T$ from the control decoder unit.

The signals held in the memory unit are sequentially read out, via a read unit 12 consisting of MOS transistors $Q21$ to $Q2n$, under the transfer control of a shift register 13 which receives a transfer signal $\Phi ST$ for a read operation supplied from the control decoder unit.

An output amplification unit 14 including MOS transistors $Q31$ and $Q32$ and an amplifier 8 is connected to the output terminal of the read unit 12.

Therefore, the signals read out in sequence as described above are output as an original storage output signal OS which is amplified by the output amplification unit 14 to the level at which A/D conversion by an A/D converter (to be described later) is possible.

The light-receiving units 6 and 7 have different apertures so that the light-receiving sensitivity can be switched from a normal high sensitivity to a low sensitivity in accordance with the brightness of an object to be photographed. These apertures have an area ratio of 8:1, and the ratio of the light-receiving sensitivities is also 8:1 corresponding to the area ratio.

Switching between the light-receiving units 6 and 7, i.e., switching between the light-receiving sensitivities is performed by setting the level of a select signal SEL, which is supplied from the control decoder unit, to "1". Consequently, it is possible to switch from the light-receiving unit 6 to the light-receiving unit 7, i.e., from the high sensitivity to the low sensitivity.

As shown in FIG. 2, in addition to the monitor unit 10, the light-receiving unit 11, the read unit 12, the shift register 13, and the output amplification unit 14, all of which are included in the distance measurement sensor 5, the sensor control circuit includes an output unit 15 and a control decoder unit 9 and a CPU 16 for controlling these units.

The control decoder unit 9 performs data communication with the CPU 16, which consists of a one-chip microcomputer, by using five input terminals CODE, DCK, $\Phi SIG$, $\Phi MON$, and RCK and one output terminal OUT, thereby decoding various commands from the CPU 16, and controlling the storage operation done by the light-receiving unit 11 (as will be described later).

The connection of a power supply system is omitted from FIG. 2.

The control decoder unit 9 will be described below.

Of the five input terminals mentioned above, the terminals CODE and DCK are dedicated terminals for receiving 4-bit serial data.

various commands (to be described later) applied from the CPU 16 to the terminal CODE are set in the control decoder unit 9 at the timings of the leading edges of a clock signal applied from the CPU 16 to the terminal DCK. Consequently, these commands are decoded by the control decoder unit 9 to enable control for various operations (to be described later).

In this embodiment, assume that each 4-bit serial data command applied from the CPU 16 to the terminal CODE of the control decoder unit 9 can be decoded at a relatively low speed.

A list of practical commands is given in FIG. 3. As in FIG. 3, 4-bit serial data (CODE) "0001" and "0010" indicate RESET 0 and RESET 1, respectively. Data "0100" and "0101" indicate light-receiving unit (PIXEL) SENSITIVITIES L and H (Low and High), respectively. Data "1001", "1010", "1011", and "1100" indicate amplification factors (×1, ×2, ×4, and ×8) AGC1, AGC2, AGC4, and AGC8, respectively, of the output amplification unit. It is also possible to add other functions, e.g., a test function.

The principal operation of the decode control performed by the control decoder unit 9 is as shown in FIG. 3. However, if decode control at a relatively low speed is possible as mentioned above, a larger number of commands can be applied from the CPU 16 to the terminal CODE of the control decoder unit 9.

The other input terminals $\Phi SIG$, $\Phi MON$, and RCK of the control decoder unit 9 have functions in accordance with the combination of the levels of signals applied from the CPU 16 to these terminals, as shown in FIG. 4A. That is, in order to execute MONITOR READ, STORAGE END, and SIGNAL READ functions (to be described later), these terminals receive a command for reading out a monitor output and a command for ending storage and supplying a transfer clock of the shift register 13.

More specifically, as shown in FIG. 4A, assuming the combination of the levels of signals applied from the CPU 16 to the terminals $\Phi SIG$, $\Phi MON$, and RCK is ($\Phi SIG \cdot \Phi MON \cdot RCK$), the control decoder unit 9 performs decode control such that MONITOR READ, STORAGE END, and SIGNAL READ functions in which signal data is read out in synchronism with the signal from the terminal RCK, are executed when ($\Phi SIG \cdot \overline{\Phi MON} \cdot RCK$)=1, ($\overline{\Phi SIG} \cdot \Phi MON \cdot RCK$)=1, and ($\overline{\Phi SIG} \cdot \Phi MON$)=1, respectively, That is, the control decoder unit 9 has a circuit configuration by which the above decode control is feasible.

Of the above operations, a time delay has a direct effect on the signal level of focus detection in the monitor read and the storage end. Therefore, these operations can be set only by the decode control by the control decoder unit 9 so that commands from the CPU 16 can be input directly.

Figure 4B:
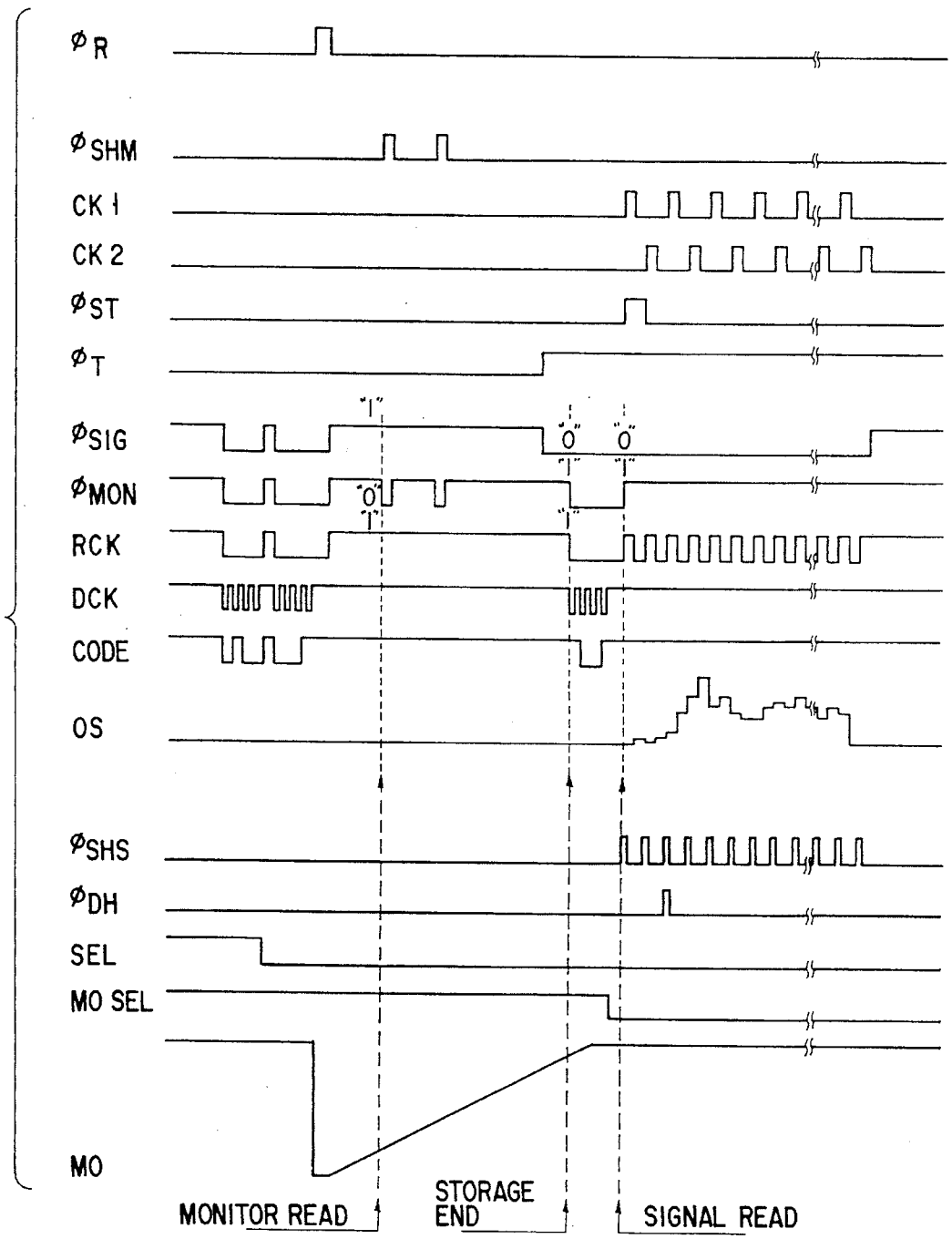

An operation of the sensor control circuit will be described with reference to FIG. 4B.

The monitor unit 10 is for monitoring the quantity of light received by the light-receiving unit 11. The monitor unit 10 and the light-receiving unit 11 are initialized at the same time storage for the light-receiving unit 11 is started, by the reset signal $\Phi R$ (RESET 0 or 1 in FIG. 3) supplied from the control decoder unit 9 in accordance with command No. 0 or No. 1 from the CPU 16 as shown in FIG. 3.

Thereafter, the output from the monitor unit 10 increases with an increase in the quantity of received light in the light-receiving unit 11.

When the CPU 16 outputs a monitor read command (MONITOR READ in FIG. 4A), the control decoder unit 9 decodes the monitor read command in accordance with the combination as shown in FIG. 4A and immediately outputs a sample-and-hold signal ΦSHM of the monitor output to a sample-and-hold unit 10A connected to the monitor unit 10.

At this time, since an output select signal MO SEL of the control decoder unit 9 with respect to the output unit 15 is "1", the output unit 15 has selected a monitor output MO from the sample-and-hold unit 10A.

The CPU 16, therefore, causes an internal A/D converter 16a to perform A/D conversion for the monitor output MO from the output terminal OUT of the control decoder unit 9. On the basis of this A/D conversion result, the CPU 16 can predict, by an arithmetic operation, a time at which the light-receiving unit 11 reaches storage end, from the storage amount in the light-receiving unit 11 at that time.

As discussed earlier, the light-receiving unit 11 receives a light beam guided by the AF module 3 and photoelectrically converts an image of an object to be photographed. The light-receiving unit 11 is initialized when the reset signal ΦR is output from the control decoder unit 9 in accordance with the storage start command (cancel of RESET 0 or 1 in FIG. 3) from the CPU 16).

The light-receiving sensitivity of the light-receiving unit 11 can be externally set (at PIXEL SENSITIVITY L or H in FIG. 3) when the control decoder unit 9 outputs the select signal SEL of "1" or "0" in accordance with command No. 2 or No. 3, respectively, from the CPU 16.

When no external input is present, it is also possible to automatically switch the light-receiving sensitivities inside the control decoder unit 9 in accordance with the brightness of an object to be photographed, as in the second embodiment (to be described later).

At the calculated time at which it is predicted by the calculation that a predetermined amount of charge is stored in the light-receiving unit 11 and storage ends, the control decoder unit 9 receives the read command (SIGNAL READ in FIG. 4A) from the CPU 16 and outputs a sample-and-hold pulse ΦSHS to a sample-and-hold unit 12A connected to the read unit 12.

This read unit 12 holds the storage signals of the individual pixels of the light-receiving unit 11 at the same time.

Also, the read unit 12 sequentially reads out the storage signals to the output unit 15 by using the shift register 13 via the sample-and-hold unit 12A and the output amplification unit 14.

That is, the shift register 13 is driven by clock signals CK1 and CK2 from the control decoder unit 9. Upon receiving a transfer pulse ΦST from the control decoder unit 9, the shift register 13 starts transfer.

The storage signals are sampled and held in synchronism with the output sample-and-hold pulse ΦSHS from the control decoder unit 9 as discussed above. In this case, another sample-and-hold unit 12B connected to the read unit 12 samples and holds dark current components contained in the storage signals in accordance with another sample-and-hold pulse ΦDH from the control decoder unit 9.

On the basis of the outputs from the two sample-and-hold units 12A and 12B, the output amplification unit 14 subtracts the dark current component from the storage signal and transfers, to the output unit 15, the signal as the original storage signal output OS which is amplified by one of the amplification factors (×1, ×2, ×4, and ×8) AGC1, AGC2, AGC4, and AGC8 decoded by commands No. 4 to No. 7 from the CPU 16 prior to performing read.

That is, the output select signal MO SEL from the control decoder unit 9 is "0" in this case, so the output unit 15 has selected the original storage signal output OS from the output amplification unit 14.

Therefore, the CPU 16 causes the internal A/D converter 16a to perform A/D conversion for the original storage signal output OS from the output terminal OUT of the control decoder unit 9. The CPU 16 then executes well-known AF arithmetic operations by using this A/D conversion result as a distance measurement signal of focus detection.

In this embodiment, a series of the above operations can be set and carried out independently of each other by data communication between the CPU 16 and the control decoder unit 9. This makes it possible to constitute the control decoder unit 9 and its individual signal generators (decoders) by a circuit of a relatively small scale. In addition, various combinations of operations can be readily performed by the software of the CPU 16.

In the above operations, it is evident that the monitor output MO from the light-receiving unit 11, the output select signal MO SEL for selecting the original storage output OS, and the sample-and-hold pulses ΦSHM, ΦSHS, and ΦDH for a sample-and-hold operation must be output in association with their respective operations. It is therefore assumed that the control decoder unit 9 is so designed as to be able to output these signals simultaneously with decode control for the individual commands from the CPU 16.

Figure 6:
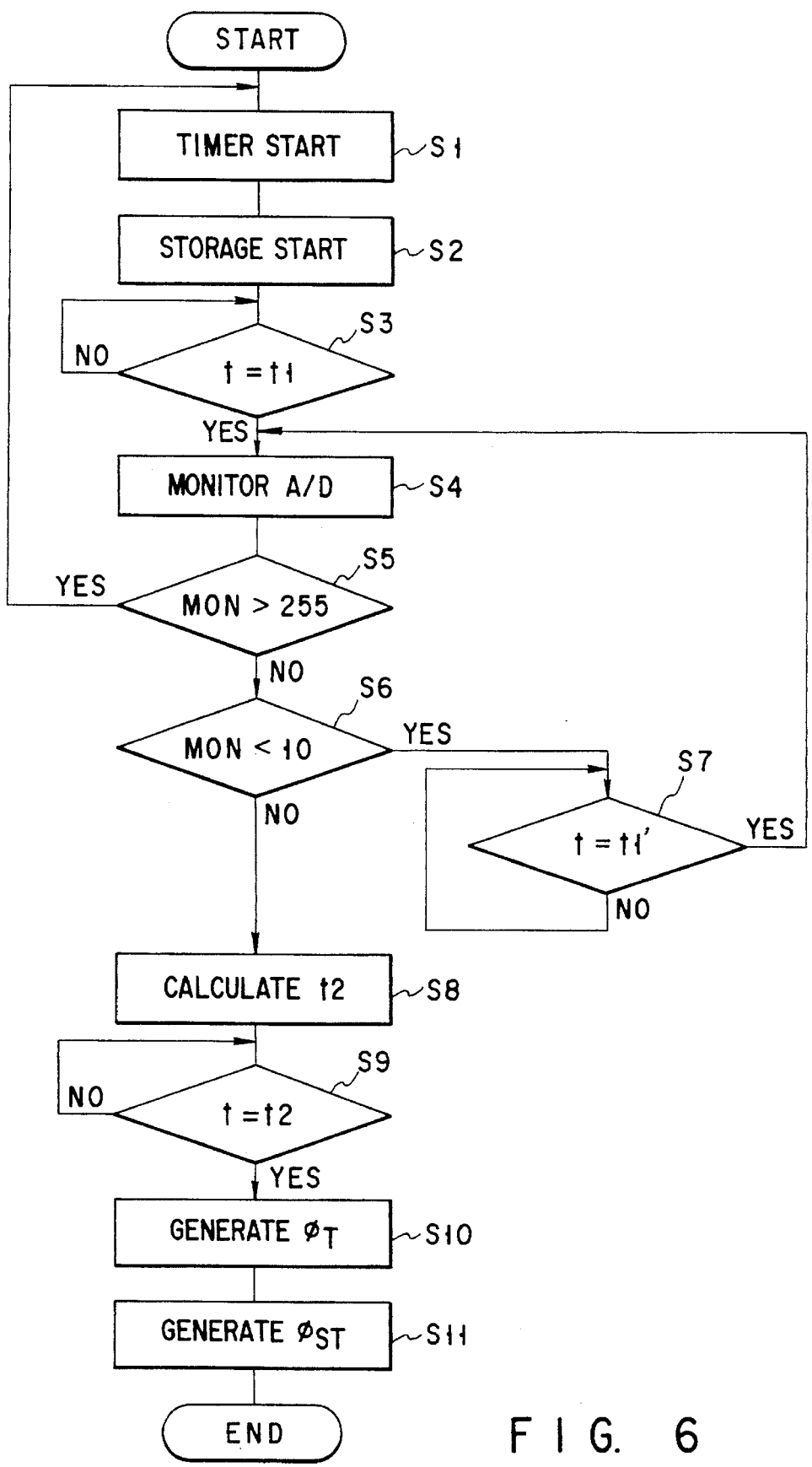
FIG. 6 is a flow chart for explaining an operation of the photoelectric conversion apparatus according to the first embodiment.

An operation of this embodiment will be described below with reference to the flow chart in FIG. 6.

The CPU 16 causes an internal timer (not shown) to start counting (step S1) and applies the reset signal ΦR to the light-receiving unit 11 via the control decoder unit 9. After this reset signal ΦR is canceled, the CPU 16 makes the light-receiving unit 11 start storage for AF calculations (step S2).

When a time t1 elapses from the start of storage, (step S3), the CPU 16 causes the internal A/D converter 26a to perform A/D conversion for the monitor output MO output via the monitor unit 10, the sample-and-hold unit 10A, and the output unit 15, in order to read out the monitor output from the light-receiving unit 11 (step S4).

Assume this monitor output MO is so preset as to have the output characteristic meeting the A/D conversion level of the internal A/D converter 16a of the CPU 16.

The CPU 16 then performs calculations for predicting a signal storage end time t2 of the light-receiving unit 11 on the basis of the A/D conversion result of the monitor output MO (step S8).

In this case, variations are caused between the output characteristic of the monitor output MO and the level of the original storage signal output OS due to the characteristics of the AF module 3 used. Therefore, in adjusting the output from the light-receiving unit 11, predetermined uniform light is irradiated on the light-receiving unit 11. From the relationship between the A/D conversion result of the monitor output MO at that time and the A/D conversion result of the original storage signal output OS, the A/D-converted value of the monitor output MO by which the original storage signal output OS gains a proper level is calculated. This value is stored in a nonvolatile memory (not shown) such as an EEPROM.

The CPU 16 calculates the storage end time t2 by using the value stored in the nonvolatile memory as a target.

In the course of this process, if the original storage signal output OS (to described later) is to be amplified with one of a plurality of amplification factors (×1, ×2, ×4, and ×8) when the signal is read out, the A/D-converted value described above or its equivalent characteristic value is stored for each amplification factor in the nonvolatile memory or the like. This allows high-accuracy control regardless of switching between the amplification factors.

If the A/D-converted value of the monitor output MO is saturated or nearly saturated because an object to be photographed is too bright, e.g., if a maximum level of "255" is output as the A/D-converted value of the monitor output MO when the A/D converter 16a of eight bits is used, it is uncertain that this value indicates a correct signal storage level. In this case, therefore, the CPU 16 changes the target value of the storage end time t2 and again makes the light-receiving unit 11 perform storage (step S5).

If, in contrast, the A/D-converted value of the monitor output MO does not reach a predetermined low-level value of "10", i.e., if an object to be photographed is relatively dark, it is difficult to determine a correct storage end time. Therefore, the CPU 16 again reads in the monitor output MO when a second predetermined time t1' elapses (steps S6 and S7).

When the above storage end time t2 is reached after it is calculated by the CPU 16, the CPU 16 causes the control decoder unit 9 to apply the storage end signal ΦT to the light-receiving unit 11 and the signal transfer pulse ΦST to the shift register 13 (steps S8, S9, S10 and S11).

As described above, the signal storage end time t2 for reading out the original storage signal output OS can be obtained by a simple calculation done by the CPU 16.

Figure 5:
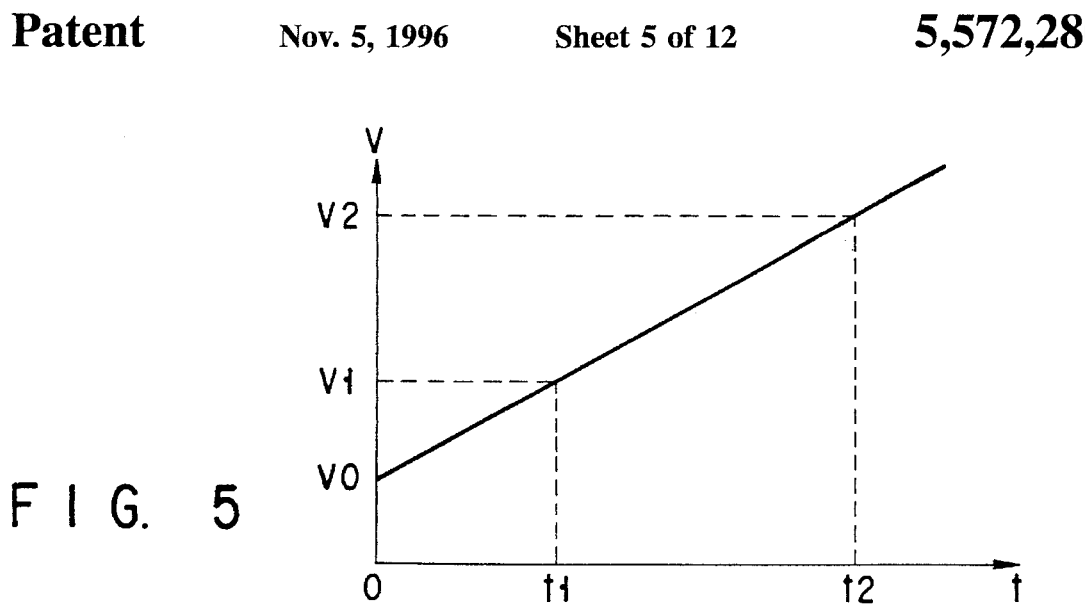
FIG. 5 is a graph for explaining the setting of a storage end time t2 for a read operation in the first embodiment.

That is, assuming that the monitor output MO with the characteristic as in FIG. 5 is obtained after the start of storage, and that the monitor output MO is a linear function, the signal storage end time t2 can be calculated as follows:

$$t2 = t1 \cdot (V2 - V0)/(V1 - V0)$$

from an A/D-converted value V1 of the monitor output MO at the time t1 and an offset value V0 and a target value V2 of the monitor output stored beforehand in the nonvolatile memory (e.g., an EEPROM).

In this case, the target value V2 is a value when the amplification factor is ×1. Target values need only be set in the CPU 16 such that a value suitable for one of the amplification factors (×1, ×2, ×4, and ×8) selected on the basis of the A/D-converted value V1 of the monitor output MO is chosen.

Note that the CPU 16 sets the signal storage end time t2 based on the above calculation result in the timer.

When the set time t2 elapses as discussed above, the CPU 16 causes the control decoder unit 9 to send the signal transfer pulse ΦST for read to the shift register 13, thereby sequentially reading out the signals stored in the light-receiving unit 11 via the read unit 12.

The signals thus read out are sampled and held by the sample-and-hold units 12A and 12B at the timings of the sample-and-hold pulses ΦSHS and ΦDH. The output amplification unit 14 subtracts dark current components from these signals and amplifies the signals to a predetermined level. Thereafter, the resulting signals are A/D-converted by the internal A/D converter 16a of the CPU 16 via the output unit 15 (step S11).

With the above sequence, the CPU 16 controls the signal storage operation for well-known focus detection, i.e., a distance measurement (AF) operation via the control decoder unit 9.

Note that the monitor output MO is directly A/D-converted in FIG. 2, but an amplification factor switching unit similar to that on the original storage signal output OS side can also be provided on the monitor output MO side. In this arrangement, if the monitor level is too low since an object to be photographed is relatively dark, the monitor output MO is amplified with a predetermined amplification factor. This allows the CPU 16 to determine the end of a signal storage time at a relatively early timing.

Figure 7A:
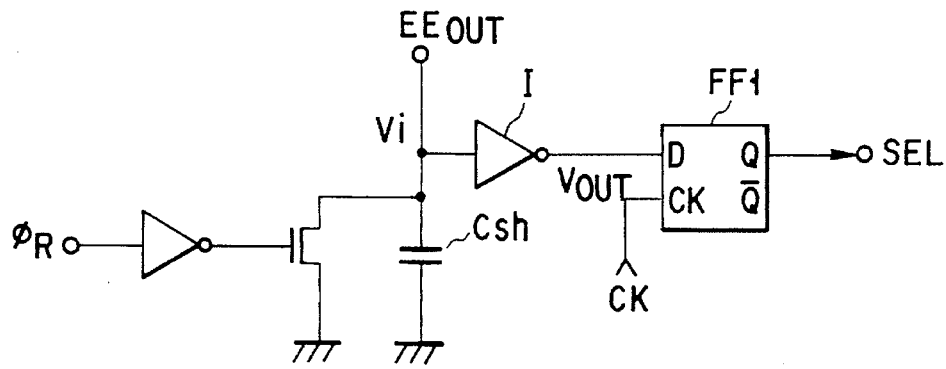
FIG. 7A is a circuit diagram showing the arrangement of the major components of the second embodiment in which sensitivity switching of a light-receiving unit is automatically performed in a control decoder unit of a sensor control circuit.
Figure 7B:
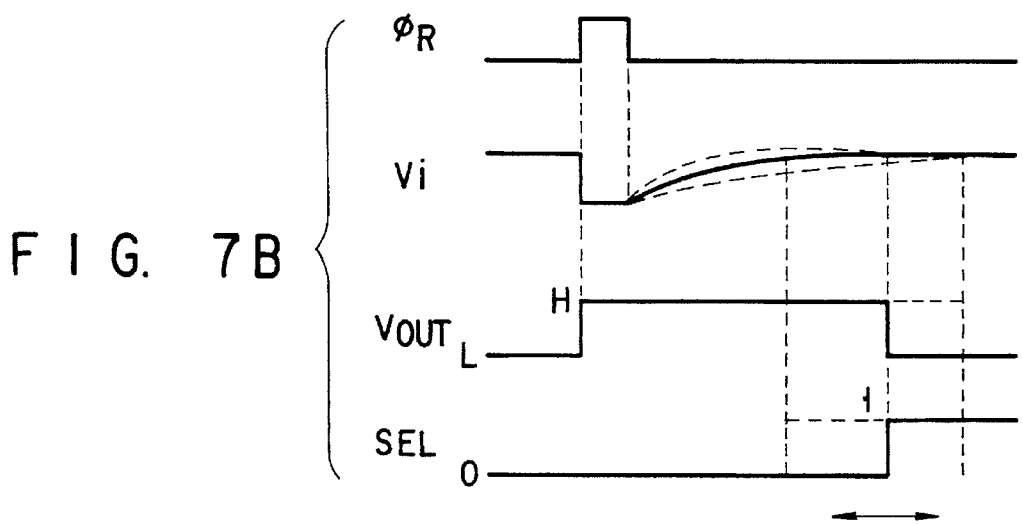
FIG. 7B is a timing chart showing the relationship between signals in the second embodiment.

FIG. 7A is a circuit diagram showing the major components of the second embodiment of the present invention, and FIG. 7B is a timing chart showing the signal waveforms of the individual components. In this second embodiment, switching between the light-receiving sensitivities of a light-receiving unit 11 is not performed by external signals in accordance with commands from a CPU 16, as in the above first embodiment, but is automatically performed inside a control decoder unit 9 in accordance with the brightness of an object to be photographed.

As in FIGS. 7A and 7B, an output Vout from an inverter I goes to high level "H" simultaneously with generation of a reset signal ΦR.

Thereafter, a capacitor Csh charges a voltage Vi from a terminal EEout for receiving the output from the light-receiving unit 11. When a predetermined value is reached, the output Vout goes to low level "L" to invert a select signal SEL for switching between light-receiving sensitivities from "0" to "1" via a flip-flop FF1.

That is, the inversion timing of this select signal SEL depends upon an increase or a decrease in the speed of the charge characteristic of a voltage value output from the light-receiving unit 11 in accordance with the brightness of an object to be photographed. This permits automatic switching between the light-receiving sensitivities inside the control decoder unit 9 such that the sensitivity changes from a high sensitivity to a low sensitivity at an early timing as the brightness of an object to be photographed increases.

The third embodiment of the present invention will be described below. This third embodiment relates to control for a signal storage operation performed when a CPU 16 starts distance measurement and then executes some other sequence.

Note that the arrangement of this third embodiment is identical with that of the first embodiment shown in FIG. 2. That is, the third embodiment uses a photometry (AE) circuit 20 which is connected to the CPU 16, and a description of which is omitted in the first embodiment.

As the photometry (AE) circuit 20, it is possible to use a known circuit which measures the brightness of an object to be photographed on the basis of an output from the sensor 4, as shown in FIG. 1A.

Figure 8:
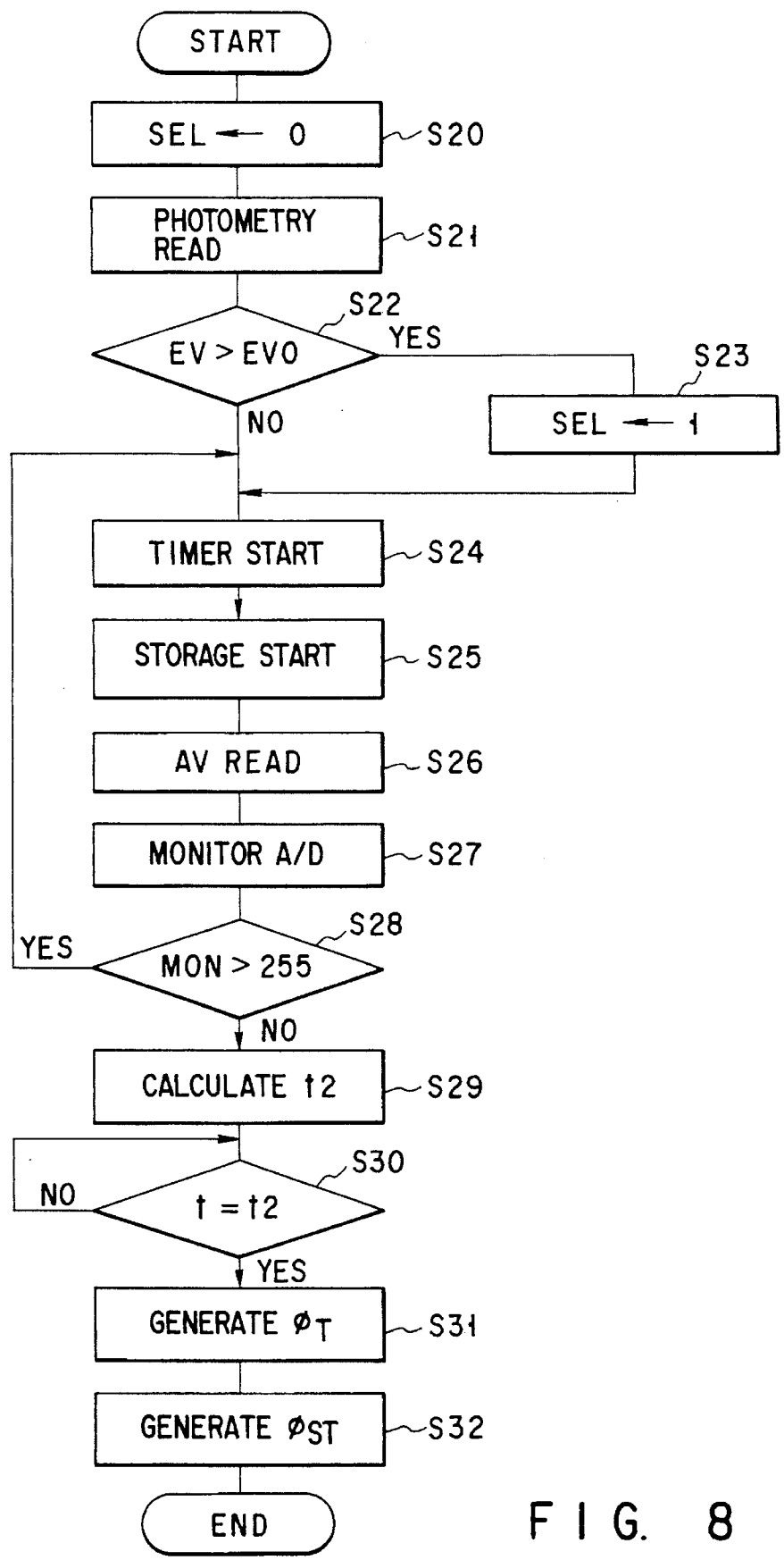
FIG. 8 is a flow chart showing an operation of a CPU 16 in the third embodiment.

FIG. 8 is a flow chart showing an operation of the CPU 16 in the third embodiment.

when distance measurement is started, the CPU 16 sets a high sensitivity (PIXEL SENSITIVITY H in FIG. 3) by setting a select signal SEL from a control decoder unit 9 to "0" (step S20). Thereafter, the CPU 16 reads in a photometric value EV from the photometry (AE) circuit 20, FIG. 2, connected to the CPU 16 (step S21).

Subsequently, the CPU 16 checks in accordance with the method to be described later whether this photometric value EV is larger than a value EV0 which is stored beforehand in a nonvolatile memory (EEPROM) or the like during adjustment and indicative of a predetermined brightness (step S22).

If the above condition is met, the CPU 16 sets the select signal SEL from the control decoder unit 9 to "1" (PIXEL SENSITIVITY L in FIG. 3). Consequently, as mentioned earlier, the effective aperture of a light-receiving unit 11 is decreased to change the light-receiving sensitivity to a low sensitivity (step S23).

If the above condition is not met, on the other hand, the CPU 16 holds the select signal SEL from the control decoder unit 9 at "0" (PIXEL SENSITIVITY H in FIG. 3). Consequently, as discussed earlier, the effective aperture of the light-receiving unit 11 is held large to keep the high sensitivity.

Subsequently, the CPU 16 causes a timer to start counting (step S24) and makes the control decoder unit 9 output a reset signal ΦR to the light-receiving unit 11. After this reset signal ΦR is canceled, the CPU 16 causes the light-receiving unit 11 to start storage (step S25).

Thereafter, the CPU 16 executes another sequence for a predetermined time period. In this embodiment, the CPU 16 executes aperture value read (AV Read) for a time $t_{cpu}$ from the start of storage of the light-receiving unit 11 (step S26).

When the time $t_{cpu}$ elapses, the CPU 16 performs necessary control for A/D-converting a monitor output MO.

That is, when the monitor output MO reaches a storage time determined by the photometric value discussed above, the CPU 16 outputs a sample-and-hold pulse ΦSHM to a sample-and-hold unit 10A via the control decoder unit 9, making the sample-and-hold unit 10A hold the level of the monitor output MO at that time. Note that the output time of the sample-and-hold pulse ΦSHM is not particularly limited (step S27).

If the A/D-converted value of the monitor output MO is "255", the CPU 16 returns to the operation in step S24 for the same reason as explained in the first embodiment.

If the A/D-converted value of the monitor output MO is smaller than "255", the CPU 16 calculates and sets a storage end time t2 from the result of the A/D conversion at that time. When this set time elapses, the CPU 16 causes the control decoder unit 9 to output a storage end signal ΦT to the light-receiving unit 11 and a transfer pulse ΦST to a shift register 13.

During the course of this process, the CPU 16 outputs a read command (MONITOR READ in FIG. 4A) via the control decoder unit 9 in the same fashion as mentioned earlier (steps S28 to S32).

In this embodiment, it is sometimes impossible for the CPU 16 to accurately determine the storage end time only with one A/D conversion result for the monitor output MO especially when the object to be photographed is bright.

This is so because, when the object is bright, the change in the monitor output MO increases during A/D conversion of the monitor output MO, and so the A/D-converted output is saturated if the read time is shifted even slightly.

To prevent this, it is only necessary to read out the monitor output MO earlier by taking account of the time error of the monitor output MO, if the object to be photographed is relatively bright.

If, in contrast, the read time is too early for the monitor output MO, the monitor output MO undesirably becomes too small in some cases.

To accurately determine the signal storage end time, therefore, it is only necessary to check the level of the monitor output MO by A/D-converting the monitor output MO again after the A/D conversion of the monitor output MO (step S28) in FIG. 8.

That is, in this embodiment, although not shown, it is possible to add a step by which the monitor output MO is read out and A/D-converted a plurality of number of times, when necessary.

Figure 12:
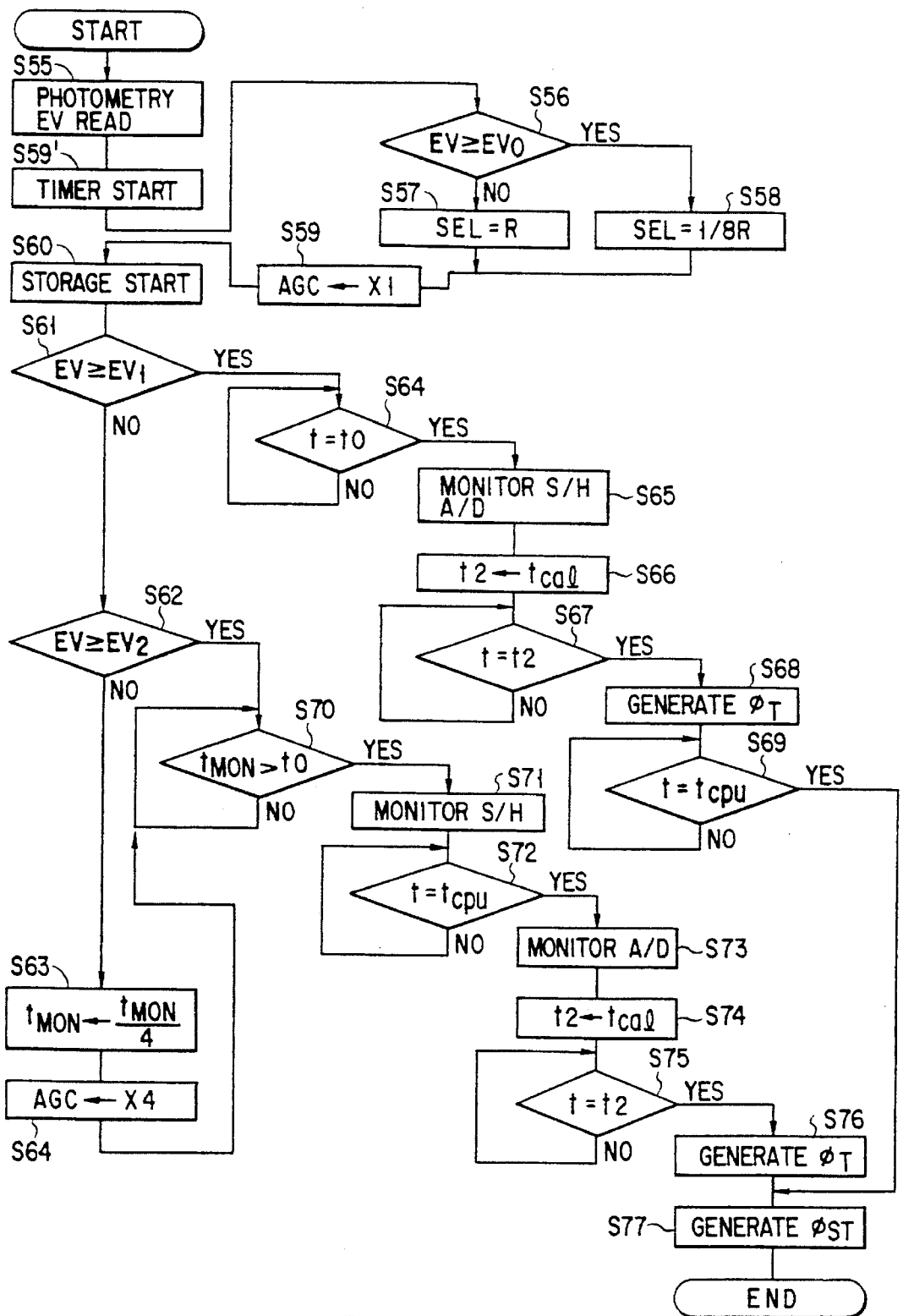
FIG. 12 is a flow chart showing a storage control operation of the fourth embodiment.

FIGS. 9 and 10 are graphs, and FIGS. 11 and 12 are a table and a flow chart, respectively, for explaining an operation of the fourth embodiment which is a more specific embodiment of the third embodiment.

In this fourth embodiment, as in the above third embodiment, a time for sampling and holding a monitor output MO is determined on the basis of a photometric output from a photometry circuit (AE) 20 shown in FIG. 2. That is, the construction of the fourth embodiment is identical with that shown in FIG. 2.

In this embodiment, control is performed under the conditions by which, until a predetermined time $t_{cpu}$ elapses after storage is started, a CPU 16 executes some other sequence.

FIG. 9 illustrates the relationship between the brightness EV of an object to be photographed and the storage time t.

FIG. 10 shows the relationships between the storage voltage V and the storage time t when the light-receiving sensitivity of a light-receiving unit 11 is set at a high sensitivity R and a low sensitivity (⅛)R, i.e., shows the photoelectric conversion characteristics of the light-receiving unit 11.

Numbers ①, ②, ③, and ④ enclosed within circles in FIG. 9 correspond to Nos. in FIG. 11 in which the individual switching characteristics are summarized, indicating the manner in which the storage end time changes in accordance with the brightness of an object to be photographed and with the light-receiving sensitivity of the light-receiving unit 11. Numbers ① and ② correspond to the photoelectric conversion characteristic at the low sensitivity (⅛)R in FIG. 10, and numbers ③ and ④ correspond to the photoelectric conversion characteristic at the high sensitivity R in FIG. 10.

No. ① in FIGS. 9 and 11 is when the photometric output EV≧ EV1, in which case the object is very bright.

At this time, assuming that the storage end time is t1, t1< $t_{cpu}$, in which condition the CPU 16 performs primarily an operation other than storage control.

Under this condition, the light-receiving sensitivity of the light-receiving unit 11 is set at the low sensitivity (⅛)R in order to ensure a response time of the CPU 16.

No. ② in FIGS. 9 and 11 is when EV0≦EV< EV1, under which condition the object is relatively bright. In this case, the storage end time t1 is longer than $t_{cpu}$ but shorter than a predetermined time t3 in FIG. 9, i.e., $t_{cpu} \leq t1 < t3$.

Under this condition, the light-receiving sensitivity of the light-receiving unit 11 is set at the low sensitivity (⅛)R for the same reason as discussed above.

No. ③ in FIGS. 9 and 11 is when EV2≦EV< EV0, under which condition the object is relatively dark. In this case, the storage end time t1 is longer than $t_{cpu}$ but shorter than the predetermined time t3 in FIG. 9, i.e., $t_{cpu} \leq t1 < t3$.

Under this condition, to shorten the control time of the CPU 16, the light-receiving sensitivity of the light-receiving unit 11 is set at the high sensitivity R.

No. ④ in FIGS. 9 and 11 is when EV< EV2, in which case the object is very dark.

Under this condition, the storage end time t1 is longer than the predetermined time t3, i.e., t3≦t1. In this case, the storage amount is insufficient even if storage is performed up to the storage limiter time by setting the light-receiving sensitivity of the light-receiving unit 11 to the high sensitivity R. Therefore, storage signals are read out by increasing the amplification factor (AGC) four times.

Note that the amplification factor (AGC) is 1 in all of Nos. ①, ②, and ③.

FIG. 12 is a flow chart of the storage control based on the above conditions.

First, the CPU 16 reads in the photometric value EV from the photometry circuit 20 to determine the brightness of an object to be photographed (step S55).

If the photometric value EV≧ EV0, the CPU 16 commands the control decoder unit 9 to set the select signal SEL for the light-receiving sensitivity of the light-receiving unit 11 at the high sensitivity R. If this is not the case, the CPU 16 commands the control decoder unit 9 to set the select signal SEL for the light-receiving sensitivity of the light-receiving unit 11 at the low sensitivity (⅛)R (steps S56, S57, and S58).

The CPU 16 then sets the amplification factor (AGC) of an output amplification unit 14 at "1" via the control decoder unit 9. After starting a timer, the CPU 16 causes the light-receiving unit 11 to start signal storage via the control decoder unit 9 (steps S59, S59', and S60).

If the photometric value EV≧EV1, signal storage of the light-receiving unit 11 is completed before the time $t_{cpu}$ elapses. Therefore, only under this condition, the CPU 16 performs control required to calculate the storage end time from the monitor output MO before an elapse of the time $t_{cpu}$ (steps S61, and S64 to S68).

First, when the time t= t0, the CPU 16 commands the control decoder unit 9 to sample and hold and A/D-convert the monitor output MO (steps S64 and S65).

The CPU 16 then calculates the storage end time t2 from the A/D conversion result and causes the timer to start counting. When the timer count reaches t2, the CPU 16 commands the control decoder unit 9 to send a storage end signal ΦT to the light-receiving unit 11 (steps S66, S67, and S68).

Although the above processing operations are performed by the CPU 16 before the time $t_{cpu}$ elapses, no inconvenience takes place because each processing time is extremely short compared to $t_{cpu}$.

Subsequently, the CPU 16 waits until the time $t_{cpu}$ elapses while holding the storage signals by the above operation. When distance measurement becomes possible, the CPU 16 commands the control decoder unit 9 to generate a signal transfer pulse ΦST, thereby starting read of the storage signals (step S77).

If the photometric value EV≧EV2, the CPU 16 commands the control decoder unit 9 to sample and hold the monitor output MO at a monitor read time $t_{MON}$ calculated from the photometric value (steps S62, S70, and S71).

When the time $t_{cpu}$ elapses, the CPU 16 sends a command for performing A/D conversion for the monitor output MO (steps S72 and S73) and calculates the storage end time t2, starting the timer (steps S74 and S75).

Thereafter, the CPU 16 generates the storage end signal ΦT and the signal transfer pulse ΦST in steps S76 and S77, respectively, and ends the operation.

In this case, if the photometric value EV≧EV0, the light-receiving sensitivity of the light-receiving unit 11 is set at the low sensitivity (⅛)R in the same manner as described above. If this is not the case, the light-receiving sensitivity is set at the high sensitivity R.

If the photometric value EV< EV2, the CPU 16 causes the control decoder unit 9 to set the amplification factor (AGC) of the output amplification unit 14 at "4", amplifying the signal output four times. For this purpose, the CPU 16 determines $t_{MON}/4$ as the monitor read time $t_{MON}$ (steps S62, S63, and S63'), and the flow advances to step S70 and the subsequent steps.

Thereafter, the CPU 16 performs processing by a flow similar to the above flow.

Figure 13:
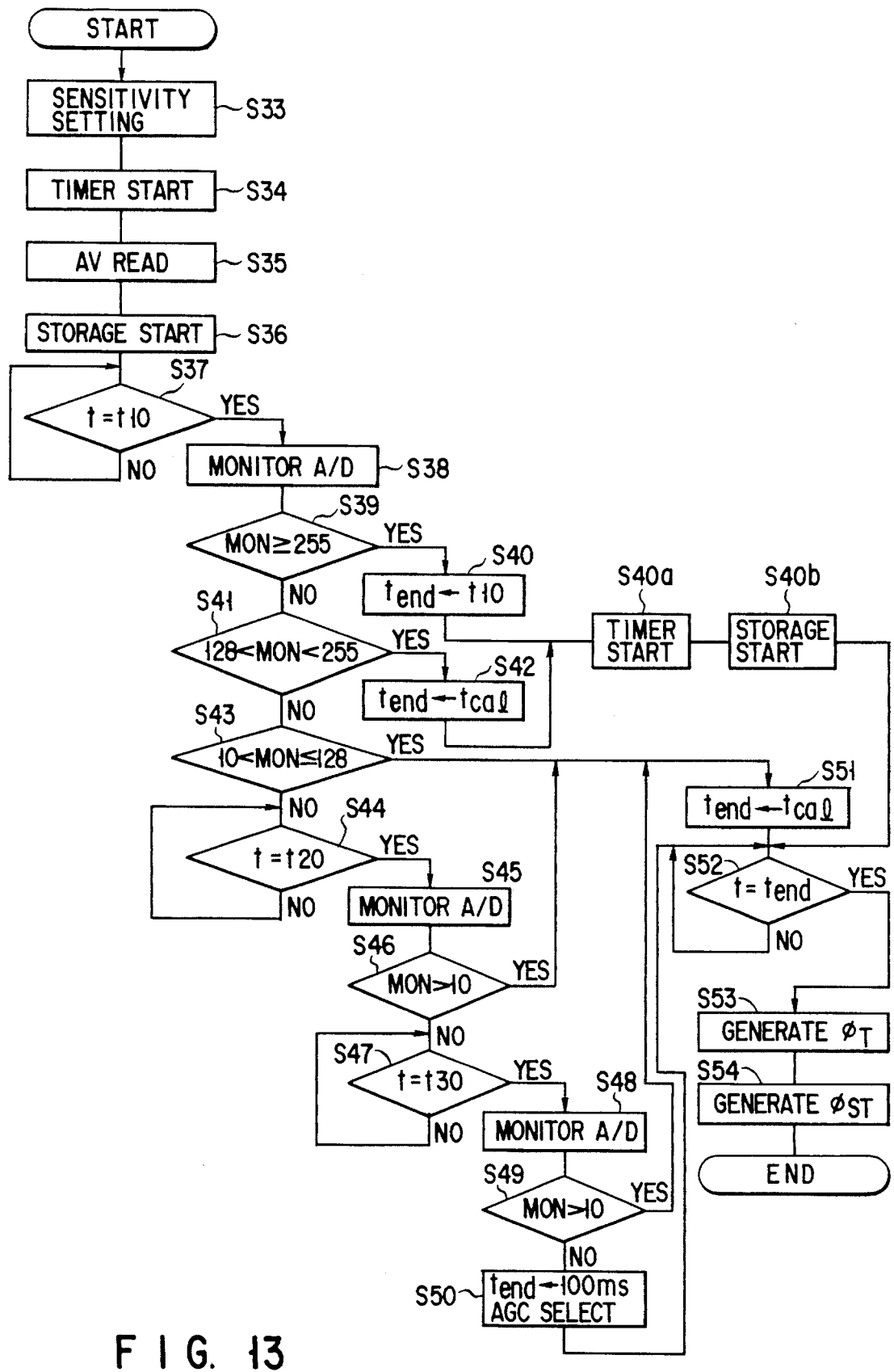
FIG. 13 is a flow chart showing the fifth embodiment.
Figure 14:
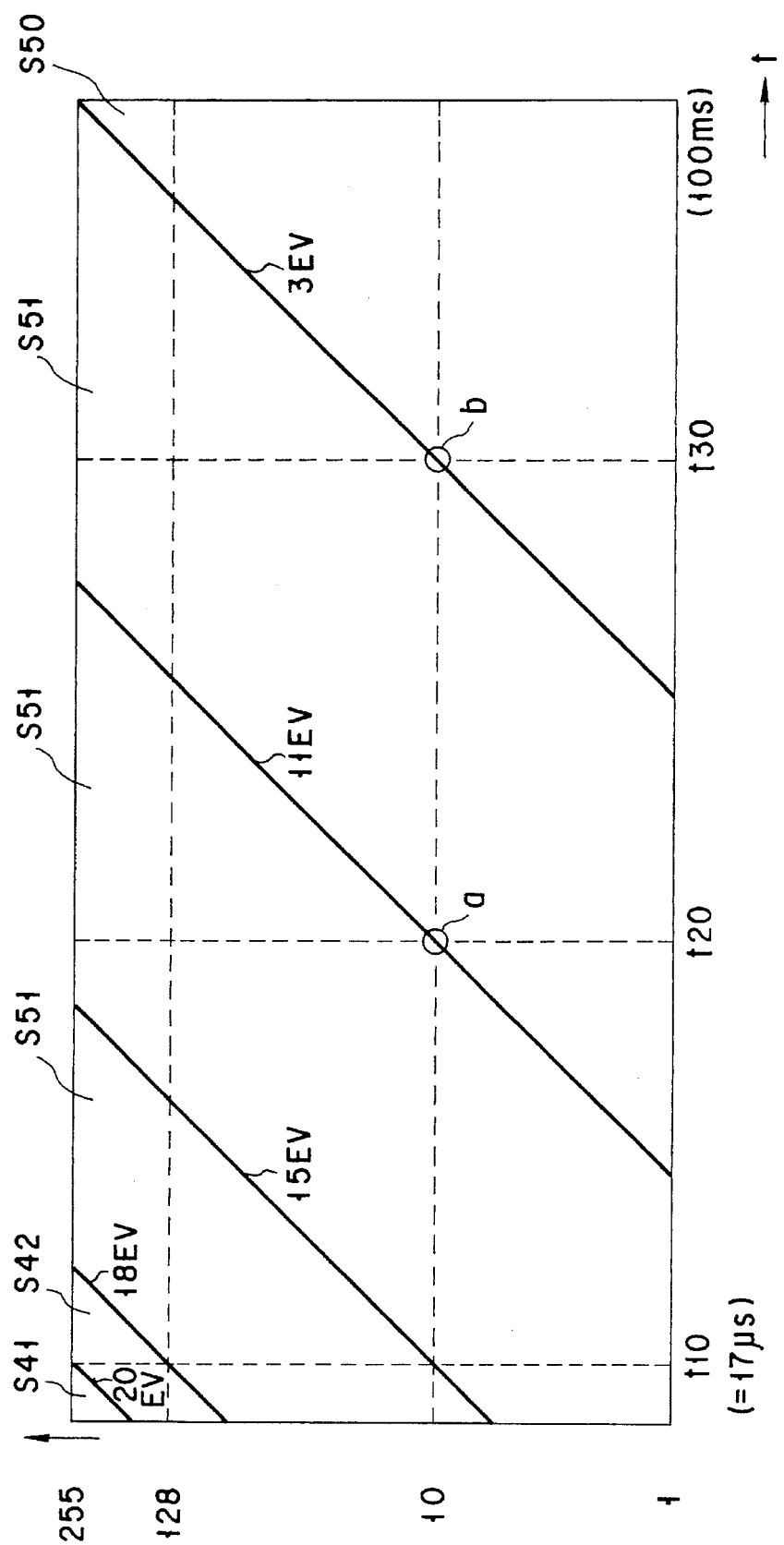
FIG. 14 is a graph for explaining an operation of the fifth embodiment.
Figure 15:
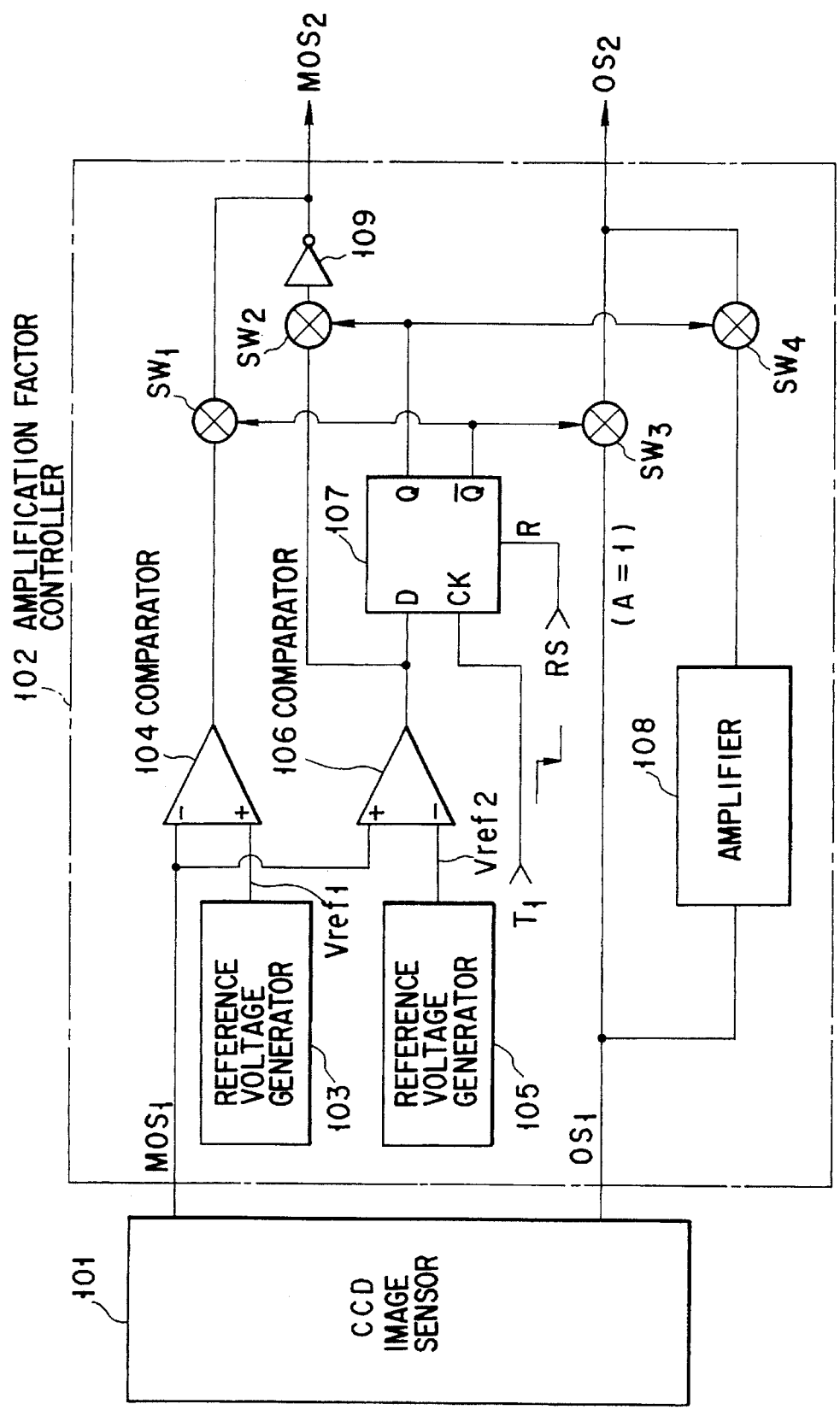
FIG. 15 is a block diagram showing the arrangement of a photoelectric conversion apparatus according to one conventional technique.

FIGS. 13 and 14 are a flow chart and a graph for explaining the fifth embodiment of the present invention.

This embodiment makes use of the function illustrated in FIGS. 7A and 7B, in which the light-receiving sensitivities of a light-receiving unit 11 are automatically switched inside a control decoder unit 9, in addition to the arrangement shown in FIG. 2.

FIG. 14 shows the relationship between the monitor output and the storage time.

In FIG. 14, times t10, t20, and t30 are fixed times. A CPU 16 starts a timer and, when each fixed time is reached, commands the control decoder unit 9 to sample and hold a monitor output MO.

This determination is done by the CPU 16 in accordance with the method in which a storage end time t2 is predicted by the calculation from the size of the monitor output MO at each time, as in the preceding embodiment. When this storage time t2 is calculated, no further read of the monitor output MO is performed.

When t= t10 and the A/D-converted value of the monitor output MO exceeds "255", this indicates a high luminance limit in FIG. 14 if the brightness is 20 EV or higher. At brightnesses higher than this one, the CPU 16 does not perform any control.

That is, t10 is a minimum time in which storage control is possible, and t10=17 μs is set in this embodiment.

The storage end time t2 is predicted by the calculation on the basis of the determination at this time t10 when the brightness has a value at which the A/D-converted value of the monitor output MO is "10" or more, i.e., when the brightness is 15 EV or higher.

When t= t20, the brightness is lower than the above one. In this case, the storage end time t2 is predicted by the calculation by taking a brightness up to 11 EV into account.

Assume that the brightness at which switching between the light-receiving sensitivities is performed by the automatic sensitivity setting function of the control decoder unit 9 used in this embodiment is 10 EV. In this case, the light-receiving sensitivity of the light-receiving unit 11 automatically shifts to ×8, i.e., three steps from 10 EV to the higher sensitivity side. Therefore, at the time t20, the storage end time can be predicted by the calculation at a brightness up to 8 EV.

When t= t30, the calculation for predicting the storage end time t2 is possible at a brightness up to 3 EV in the same manner as mentioned above. If the brightness is lower than this one, the A/D-converted value does not reach "255" even if storage is performed for 100 ms. Therefore, the CPU 16 fixes the storage time to 100 ms and calculates the amplification factor of the output signal from the monitor output MO, setting the amplification factor (AGC) of the output amplification unit 14 via the control decoder unit 9.

Note that reference symbols S41 to S50 in FIG. 14 correspond to the step numbers of the flow chart in FIG. 13.

FIG. 13 is a flow chart for explaining an operation of the fifth embodiment.

First, by the automatic sensitivity setting function of the control decoder unit 9 as discussed above, the light-receiving sensitivity of the light-receiving unit 11 is automatically set in accordance with the brightness of an object to be photographed (step S33).

The CPU 16 starts the timer and makes the light-receiving unit 11 start storage via the control decoder unit 9 (steps S34, S35, and S36).

When the predetermined time t10 is reached, the CPU 16 commands the control decoder unit 9 to sample and hold and A/D-convert the monitor output MO (steps S37 and S38).

If the A/D-converted value (to be referred to as MON hereinafter) of the monitor output MO is "255", the object is very bright, and so the CPU 16 does not perform any control at values higher than this one.

Even under this condition, however, if the object has contrast, distance measurement and calculation are possible. Therefore, assuming the storage end time is $t_{end}$, the CPU 16 sets $t_{end}$=t10 (step S40), and the flow advances to steps S40a and S40b. In these steps, the CPU 16 starts the timer to cause the light-receiving unit 11 to start storage. Thereafter, the flow advances to step S52 (to be described later).

Likewise, if 255> MON>128, the CPU 16 calculates the storage end time and sets the calculated value as $t_{end}$ (steps S41 and S42). This calculated time elapses within the time required for the A/D conversion and the calculation. After the setting, therefore, the flow advances to steps S40a and S40b, and the CPU 16 starts the timer to make the light-receiving unit 11 start storage. Thereafter, the flow advances to step S52 (to be described later).

The above two processing operations are completed in extremely short time periods, so the influence of redoing storage is insignificant.

If 128≧MON>10, the CPU 16 predicts the storage end time by the calculation from the MON value in accordance with the above method and sets the calculated time as $t_{end}$ (steps S43 and S51).

When the time $t_{end}$ is reached, the CPU 16 commands the control decoder unit 9 to stop the storage and read out the signals (steps S52, S53, and S54).

If MON≦10, the CPU 16 commands the control decoder unit 9 to perform A/D conversion again for the monitor output MO at the next predetermined time t20 (steps S43, S44, and S45).

If MON>10, the flow advances to step S51, and the CPU 16 predicts the storage end time.

If MON≦10, the CPU 16 commands the control decoder unit 9 to A/D-convert the monitor output MO again at the time t30 (steps S46, S47, and S48).

If MON>10, the CPU 16 performs the processing in step S51. If MON≦10, the CPU 16 sets $t_{end}$=100 ms and determines the amplification factor of the output signal on the basis of the A/D-converted value of the monitor output MO at that time and the storage time. The CPU 16 outputs the amplification factor thus determined via the control decoder unit 9 (steps S49 and S50).

Thereafter, the CPU 16 executes the processing from step S51 and the subsequent steps.

That is, in the present invention, when a predetermined time determined by a photometric output value elapses from the start of storage, the monitor output of focus detection data is read out, and the storage end time is determined on the basis of this value. This eliminates the use of a storage end determination voltage generating means or a storage end time set counter.

Additionally, in the present invention, the storage time of a light-receiving unit is controlled without reading out signal data. This makes it possible to reduce the circuit scale and eliminate the use of another sequence or storage end interruption. Consequently, more flexible operation control can be performed.

Furthermore, in the present invention, no interruption is necessary, and the synchronization of control signals at the end of storage can be set in advance. Therefore, flexible storage control can be performed without using any special circuit even in a system in which a sensor, such as a CCD image sensor, which requires clock synchronization in signal transfer is used as a light-receiving unit in place of a MOS amplification type photodiode array.

According to the present invention as has been discussed in detail above, it is possible to provide a photoelectric conversion apparatus which is reduced in circuit scale and capable of optimally controlling signal storage of a sensor, and a camera using this apparatus in focus detection.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A photoelectric conversion apparatus comprising:

photoelectric converting means including a plurality of photoelectric conversion devices for receiving light from an object and for storing charge corresponding to a quantity of received light;

monitor means for outputting a monitor signal corresponding to the received light quantity from a start of charge storage by said photoelectric conversion devices of said photoelectric converting means;

monitor read means for reading out the monitor signal output from said monitor means when a predetermined time elapses from the start of the charge storage by said photoelectric converting means;

time determining means for determining an end time of the charge storage by said photoelectric converting means on the basis of the monitor signal read out by said monitor read means; and signal read means for reading out charge signals stored in said photoelectric conversion devices of said photoelectric converting means when the charge storage end time determined by said time determining means elapses.

2. An apparatus according to claim 1, further comprising:

control means for commanding said photoelectric converting means to redo the charge storage if the monitor signal read out by said monitor read means when the predetermined time elapses is larger than a predetermined value.

3. An apparatus according to claim 1, further comprising:

control means for resetting the predetermined time and for commanding said photoelectric converting means to continue the charge storage if the monitor signal read out by said monitor read means when the predetermined time elapses is smaller than a predetermined value.

4. An apparatus according to claim 1, further comprising:

A/D-converting means for converting the monitor signal read out by said monitor read means and the charge signals read out by said signal read means into digital signals.

5. An apparatus according to claim 1, wherein the monitor signal output from said monitor means is sampled and held when the predetermined time elapses, and is then read out by said monitor read means.

6. An apparatus according to claim 1, further comprising:

amplification factor determining means for determining an amplification factor corresponding to the monitor signal read out by said monitor read means; and amplifying means for amplifying the charge signals read out by said signal read means in accordance with the amplification factor determined by said amplification factor determining means.

7. An apparatus according to claim 1, further comprising:

sensitivity switching means for switching light-receiving sensitivities of said photoelectric converting means in accordance with a magnitude of the monitor signal read out by said monitor read means.

8. A photoelectric conversion apparatus comprising:

photoelectric converting means including a plurality of photoelectric conversion devices for receiving light from an object and for storing charge corresponding to a quantity of received light;

photometry means for performing photometry for the light from said object and for outputting a photometric signal;

time determining means for determining an end time of charge storage by said photoelectric converting means on the basis of the photometric signal output from said photometry means; and signal read means for reading out charge signals stored in said photoelectric conversion devices of said photoelectric converting means when the charge storage end time determined by said time determining means elapses.

9. An apparatus according to claim 8, further comprising:

monitor means for outputting a monitor signal corresponding to the received light quantity from a start of the charge storage by said photoelectric converting means;

monitor read means for reading out the output monitor signal from said monitor means at a predetermined timing from the start of the charge storage by said photoelectric converting means; and control means for commanding said photoelectric converting means to redo the charge storage if the monitor signal read out by said monitor read means is larger than a predetermined value.

10. An apparatus according to claim 8, further comprising:

monitor means for outputting a monitor signal corresponding to the received light quantity from a start of the charge storage by said photoelectric converting means; and charge storage ending means for forcing said photoelectric converting means to end the charge storage when the output from said monitor means reaches a predetermined value.

11. An apparatus according to claim 8, further comprising:

monitor means for outputting a monitor signal corresponding to the received light quantity from a start of the charge storage by said photoelectric converting means;

amplification factor determining means for determining an amplification factor corresponding to the monitor signal read out by said monitor read means; and amplifying means for amplifying the charge signals read out by said signal read means in accordance with the amplification factor determined by said amplification factor determining means.

12. A photoelectric conversion apparatus comprising:

photoelectric converting means including a plurality of charge-storage photoelectric conversion devices;

storage time predicting means for predicting a proper charge storage time of said photoelectric converting means; and charge storage time control means for controlling a charge storage time of said photoelectric converting means in accordance with the proper charge storage time predicted by said storage time predicting means.

13. An apparatus according to claim 12, further comprising:

monitor means for outputting a monitor signal corresponding to a quantity of received light from a start of charge storage by said photoelectric converting means; and monitor read means for reading out the output monitor signal from said monitor means when a predetermined time elapses from the start of the charge storage by said photoelectric converting means, and wherein said storage time predicting means predicts the proper charge storage time on the basis of the monitor signal read out by said monitor read means.

14. An apparatus according to claim 12, further comprising:

photometry means for performing photometry for ambient light, and wherein said storage time predicting means predicts the proper charge storage time on the basis of the photometric value of said photometry means.

15. A camera comprising:

a focus detection apparatus; and a one-chip microcomputer for controlling said focus detection apparatus, said focus detection apparatus comprising:

a) sensor means having a charge-storage photoelectric conversion device array;

b) monitor means for outputting a monitor signal corresponding to a quantity of light received by said charge-storage photoelectric conversion device array; and c) control means for controlling a charge storage operation and a charge signal read operation of said charge-storage photoelectric conversion device array, wherein said one-chip microcomputer includes predicting means for predicting a time during which a charge storage amount of said charge-storage photoelectric conversion device array becomes appropriate on the basis of the monitor signal output from said monitor means, and for outputting a storage end signal to said control means when the predicted time elapses.

16. A camera comprising:

a focus detection apparatus; and a one-chip microcomputer for controlling said focus detection apparatus, said focus detection apparatus comprising:

a) sensor means having a charge-storage photoelectric conversion device array; and b) control means for controlling a charge storage operation and a charge signal read operation of said charge-storage photoelectric conversion device array, and said one-chip microcomputer comprising:

a) a parallel communication line for outputting signals requiring instantaneous control in parallel; and b) a serial communication line for serially outputting signals not requiring instantaneous control, wherein said control means of said focus detection apparatus includes communicating means for communicating with said parallel communication line and said serial communication line of said one-chip microcomputer.

17. A camera according to claim 16, wherein said focus detection apparatus includes an amplifier for amplifying charge signals with a variable amplification factor, and said one-chip microcomputer transmits the variable amplification factor of said amplifier to said focus detection apparatus through said serial communication line.

18. A camera according to claim 16, wherein a light-receiving sensitivity of said charge-storage photoelectric conversion device array is variable, and said one-chip microcomputer transmits information relating to the light-receiving sensitivity of said charge-storage photoelectric conversion device array to said focus detection apparatus through said serial communication line.

* * * * *